Sept. 20, 1938.  R. E. McCLURE  2,130,808

SELECTIVE CONTROL SYSTEM

Filed Nov. 5, 1936  2 Sheets—Sheet 1

INVENTOR
Robert E. McClure
by his attorneys
Stebbins, Blenko & Parmelee

Sept. 20, 1938.   R. E. McCLURE   2,130,808
SELECTIVE CONTROL SYSTEM
Filed Nov. 5, 1936   2 Sheets-Sheet 2
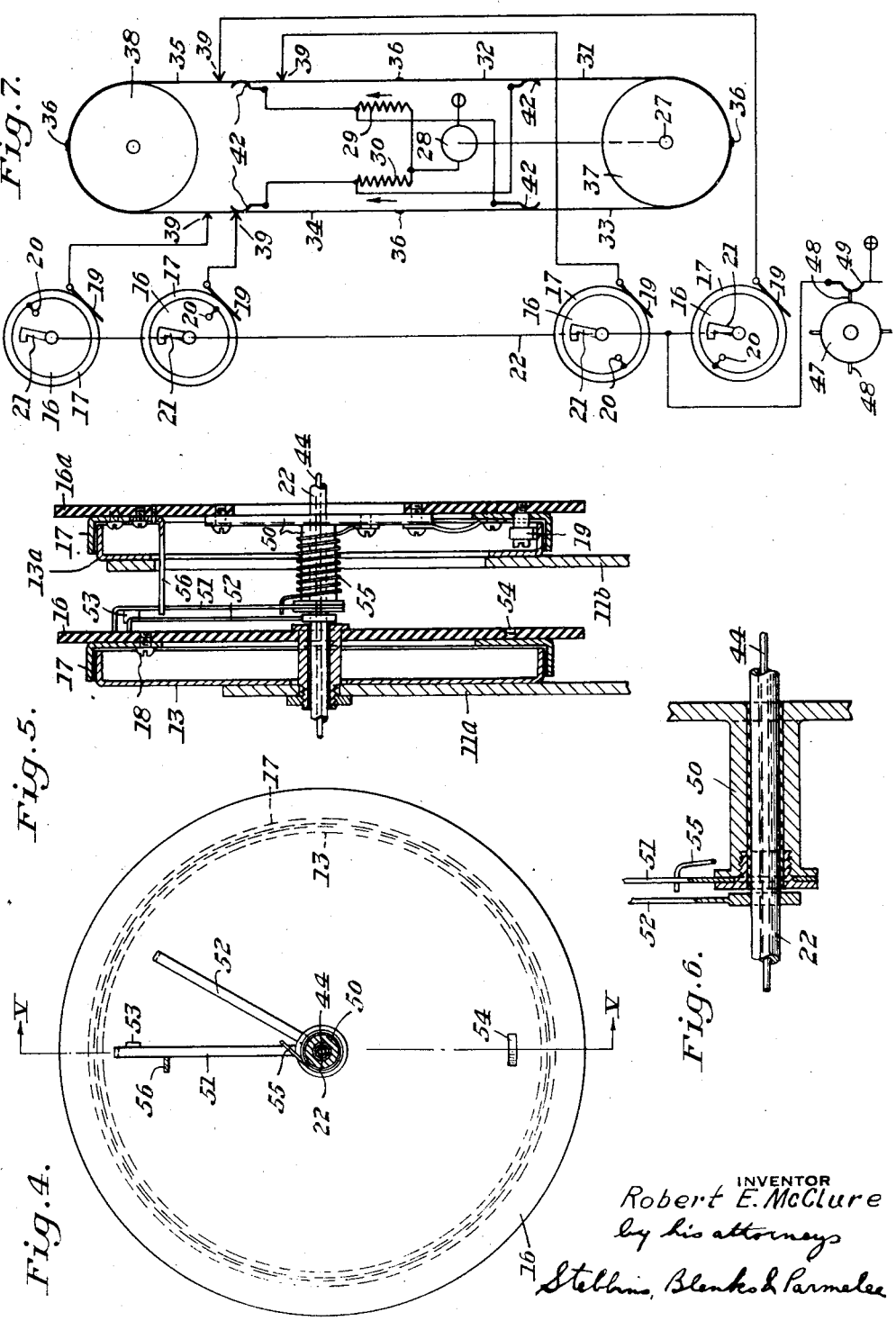
INVENTOR
Robert E. McClure
by his attorneys
Stebbins, Blenko & Parmelee Patented Sept. 20, 1938

2,130,808

UNITED STATES PATENT OFFICE 2,130,808

SELECTIVE CONTROL SYSTEM

Robert E. McClure, Warren, Ohio, assignor, by mesne assignments, to The Wean Engineering Co., Inc., Warren, Ohio, a corporation of Ohio Application November 5, 1936, Serial No. 109,317

3 Claims. (Cl. 200—37)

This invention relates to a device for automatically closing a plurality of control circuits at pre-selected times. It is applicable to a wide variety of uses. One of these for which it is particularly suited, is the automatic tuning of a radio receiver, to bring in various stations at times chosen in advance. While the invention will be described with reference to such application, it will be understood that it may be employed for other purposes as well.

The object of the invention is to provide a device of the character mentioned, which is simple in construction and easy to adjust so that the proper desired sequence of operations will be produced. The invention is thus an improvement on the structure described and claimed in my Patent No. 2,050,719. In accordance with the invention, I provide a plurality of adjustable discs, one for each of the stations to be tuned. A master clock drives contact arms cooperating with the discs which close the several control circuits at times determined by the positions to which the discs are adjusted. The invention also incorporates a modified form of device for automatically turning a radio receiver on and off.

A preferred embodiment of the invention is illustrated in the accompanying drawings, although it will be understood that the latter are illustrative only. In the drawings, Fig. 1 is an elevation of a control panel;

Fig. 4 is a sectional view taken along the line IV—IV of Fig. 2;

Fig. 5 is a sectional view taken along the line V—V of Fig. 4, with parts in elevation;

Fig. 6 is a sectional view taken along the same plane as Fig. 5, to enlarged scale, showing in section some of the parts shown in elevation in Fig. 5; and Fig. 7 is a circuit diagram illustrating the application of the invention to the automatic tuning of a radio receiver.

Figure 2:
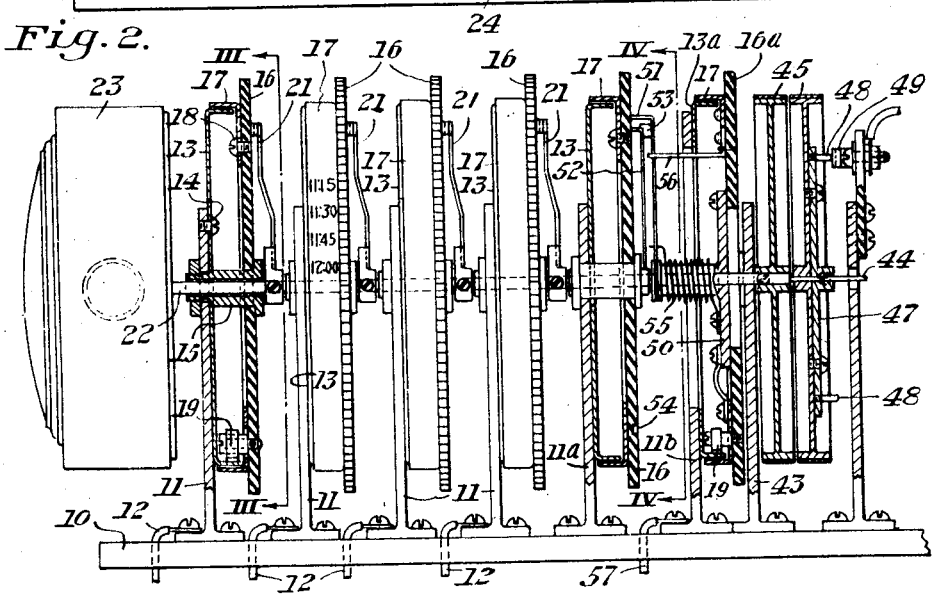
Fig. 2 is an elevation of the control apparatus with the panel removed, parts being shown in section.
Figure 3:
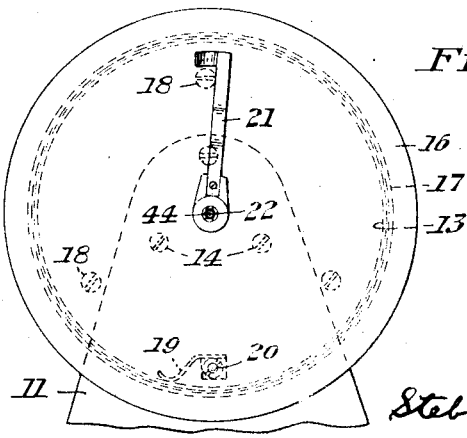
Fig. 3 is a sectional view taken along the line III—III of Fig. 2.

Referring in detail to the drawings and, for the present, to Fig. 2 particularly, the invention comprises a base 10 of insulating material having a plurality of standards 11 upstanding therefrom. The standards are of conducting material, and serve as terminals for connections 12. The number of the standards 11 provided in any given case is determined by the number of stations it is desired to tune automatically, or other devices which it is desired to operate at predetermined times, there being at least one standard for each station or device, and more than one if a repeated operation of any is desirable. The standards 11 and the apparatus associated with each are identical, and a description of one will suffice for all.

A flanged disc or cup 13 is secured to the standard 11 by a screw 14, for example. An arbor 15 is mounted on the standard 11, extending through the latter and the cup 13, but insulated therefrom. A disc 16 is rotatable on the arbor 15 and carries with it a flanged ring 17 secured thereto, as by a screw 18. The flange of the ring 17 overlies the flange of the cup 13. A brush 19 carried on a screw 20 extending through the disc 16 cooperates with the flange of the cup 13. Since the standard 11, cup 13, ring 17, brush 19 and screw 20 are all of conducting material, the connection 12 establishes contact with the screw 20.

The end of the screw projects through the disc sufficiently to cooperate with a moving contact finger 21. The contact finger 21 is mounted on the hour-hand shaft 22 extending rearwardly from a clock 23. The clock may conveniently be mounted in any desirable manner (not shown) on the base 10 with its rearwardly extending hour-hand passing through the arbor 15. The contact finger 21 is preferably disposed in alinement with the hour-hand of the clock 23, and moves therewith. At the proper time, depending on the adjustment of disc 16, the finger 21 engages the contact 20 to complete a control circuit in the manner which will be described in greater detail later.

Figure 1:
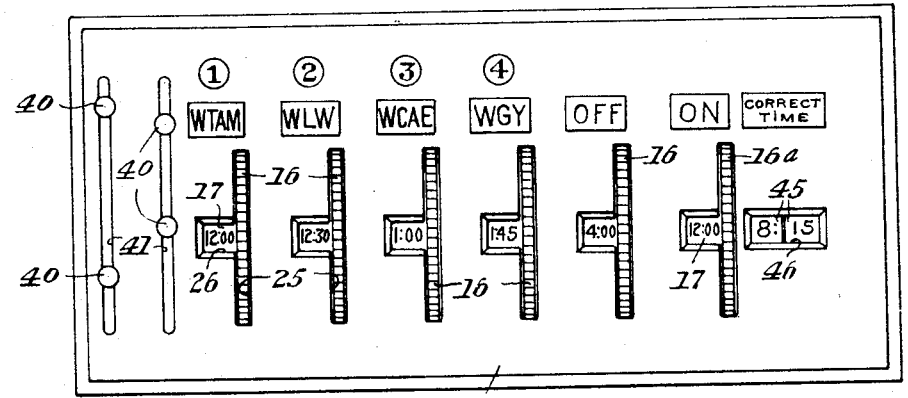

A panel 24 extends upwardly from the base alongside the standards 11, and has slots 25 therein through which the peripheries of the discs 16 project for easy manipulation by the operator. The flanges of the rings 17 are provided with time scales visible through slots 26 in the panel, as shown in Fig. 1, whereby the contacts 20 may be so positioned as to be engaged by the fingers 21 at the proper time indicated on the associated time scale. Each of the discs 16 is associated with a particular broadcasting station and, if desired, a plurality of discs may be provided for any selected station.

The operation of the invention to tune any desired broadcasting station automatically is similar to that of the system of my patent abovementioned, and will be described with particular reference to Fig. 7 in which the usual tuning shaft is indicated at 27. This shaft is adapted to be driven by a motor 28 having forward and reverse field windings 29 and 30. A conducting band 31 composed of four sections 32, 33, 34 and 35, separated by the insulating joints 36, is trained over a pulley 37 on the shaft 27 and a cooperating pulley 38 spaced therefrom and suitably mounted for rotation.

Adjustable contacts 39 are associated with the band 31 in the manner indicated in Fig. 7. These contacts are operable by knobs 40 accessible on the exterior of the panel 24, and slidable in slots 41 therein. Since the shaft 27 is usually parallel to the front wall of the case in which the receiver is mounted, the panel 24 is preferably disposed in the side wall thereof so that the contacts 39 movable along the slots 41 will engage the conducting bands 31, as shown in Fig. 7. Engagement of the contact 20 associated with any particular station, by its finger 21, causes one of the band sections to be energized. Brushes 42 engaging these sections are connected to the motor windings 29 and 30, whereby to cause appropriate rotation of the latter to move one of the insulated joints 36 toward the contact 39 associated with that station, whereupon the motor windings are deenergized and the shaft 27 comes to rest in the proper position to tune the selected station. The knobs 40 are, of course, first adjusted in their slots 41 after tuning the receiver manually to the several stations, and then setting the knobs in the positions occupied by the insulated joints when the stations are properly tuned.

The outer end of the hour-hand shaft 22 of the clock is journaled in a suitable bearing carried in a standard 43. The minute-hand shaft of the clock 23 has a rearward extension 44 coaxial with the hour-hand shaft extension 22. Annular members 45 mounted as shown in Fig. 2 show the correct time through a slot 46 in the panel 24. The member 45 mounted on the minute-hand shaft extension carries a disc 47 having pins 48 and 90° apart peripherally thereof. These pins are adapted to close a contact 49 at fifteen-minute intervals. As shown in Fig. 7, the contact 49 connects the shaft 22 and, consequently, the fingers 21 to one side of a source of control current, the motor 28 having one terminal connected to the other side of the source, and its other terminals connected to the brushes 42.

It will be apparent from the foregoing description that the motor 28 operates to tune the receiver by shifting the shaft 27 to various positions from time to time, as the several contacts 20 are successively energized by the engagement of the fingers 21 with the contacts 20.

In addition to an improved form of selective device, I also provide means for turning the receiver on and off at predetermined times. Such means include parts similar to those which have already been described. Standards 11a and 11b, similar in general to those shown at 11, are mounted on the base 10. The former has a cup 15, disc 16 and ring 17. Similarly, the standard 11b carries a rotatable disc 16a having a ring 17 thereon. A flanged ring 18a fits into the ring 17 as shown in Fig. 2, being carried on the standard 11b.

An arbor 50 is mounted on the disc 16a and extends through the standard 11b toward the disc 16 on the support 11a. A contact finger 51 is rotatably mounted at the end of the arbor 50, and is adapted to be engaged by a contact finger 52 secured to the shaft 22. The contact 51 has a projection 53 such that when it is engaged by the contact 52, the contact 51 moves with the contact 52 until the end of the latter reaches a recess 54 in the disc 16, depending on the adjustment of the latter. The contact finger 52 is sprung so that it is constantly urged toward the disc 16, and when its end enters the recess 54, it will escape the projection 53. An inclined track extending from the bottom of the recess 54 restores the finger 52 to its illustrated position shortly after it escapes from the finger 51. A light spiral spring 55 restores the finger 51 to the illustrated position against a stop 56 projecting from the disc 16a.

It will be seen from the above description that the on and off control of this invention is similar to that described and claimed in my copending application Serial No. 94,922. The disc 16a is adjusted to a position corresponding with the time at which it is desired to start operation of the receiver, carrying the finger 51 with it. When the hour-hand shaft 22 of the clock 23 has progressed sufficiently, the finger 52 engages the projection 53, completing a circuit from the energy source aforementioned through the shaft 22 by means of a brush not shown, finger 52, finger 51, spring 55, ring 17, brush 19, and standard 11b to a connection 57. This connection may extend directly to the primary winding of the transformer supplying energy to the receiver tubes or to the winding of a relay which controls the transformer circuit.

The spring 55 and the stop 56 permit the contact finger 51 to be adjusted to any desired position, and the spring is of such construction to permit the finger 51 to move with the finger 52 when engaged by the latter.

It will be apparent from the foregoing description that the invention provides a simple, yet rugged, device which greatly facilitates the advance selection of the sequence of a number of automatic operations such as the tuning of a radio receiver or the like. It is but the work of a moment to set the discs 16, so that at the time for which they are adjusted the stations with which they are associated will be tuned in automatically. The moving contacts are all driven by a common shaft, and are thus advanced into engagement with the relatively fixed contacts at precisely the proper time. The automatic turning on and off of the receiver is similarly accomplished. The times at which the receiver is to come on and go off and in which the various stations are to be heard are indicated by the time scales associated with the manually adjustable discs. The annular members 45 provide a time indication convenient to the discs, while the main dial of the clock indicates the time in the usual manner, preferably being mounted in the front wall of the receiver case.

The disposition of the contacts 39 in groups for cooperation with sections of the bands 31 on opposite sides of the line joining the axes of the pulleys 37 and 38 permits a considerable number of stations to be tuned without crowding within a relatively short vertical dimension, which is highly desirable in the present state of receiver cabinet design.

It will be understood that the number of stations for which the apparatus is designed may be changed within wide limits, as well as other details of construction, without departing from the spirit of the invention or the scope of the appended claims.

I claim:
1. Apparatus for automatically closing control circuits at preselected time, comprising a plurality of discs mounted for rotation about a common axis, each disc having a contact thereon, brush and slip-ring, means cooperating with each disc for connecting the contact thereon to a relatively fixed conductor, a common shaft extending axially through the discs, a constant speed drive for the shaft, contact fingers extending radially therefrom adapted to engage said contacts, respectively, said brush and slip-ring means including a conducting ring, a standard for supporting it, a brush on the disc engaging said ring and connected to the contact, and means rotatably mounting said disc on said standard.

2. A selective control device comprising a base, a plurality of standards extending upwardly therefrom, a disc rotatably mounted on each standard, the discs on the standards being arranged coaxially, a contact carried by each disc, a common shaft extending axially through said discs, and contact fingers on said shaft adapted to engage the contacts carried by said discs, respectively.

3. Apparatus for closing control circuits at preselected times comprising a plurality of alined standards each having a hollow bushing secured thereto on a common axis, a disc journaled on each bushing, a contact on each disc, conducting means connected to said contact including a fixed member, a shaft extending along said common axis through said bushings, fingers secured to said shaft adapted to engage the contacts on said discs respectively, and a substantially constant speed driving means for said shaft.

ROBERT E. McCLURE.

CERTIFICATE OF CORRECTION.

Patent No. 2,130,808. September 20, 1938.

ROBERT E. McCLURE.

It is hereby certified that error appears in the printed specification of the above numbered patent requiring correction as follows: Page 2, first column, line 41, for "and" read spaced; and that the said Letters Patent should be read with this correction therein that the same may conform to the record of the case in the Patent Office.

Signed and sealed this 25th day of October, A. D. 1938.

Henry Van Arsdale (Seal)

Acting Commissioner of Patents.